Oct. 2, 1945.  A. J. SWANSON  2,385,891

HYDRAULIC CONTROL

Filed Oct. 4, 1940  2 Sheets-Sheet 1

ALFRED J. SWANSON
INVENTOR.

BY *Miner L. Hartmann*
ATTORNEY.

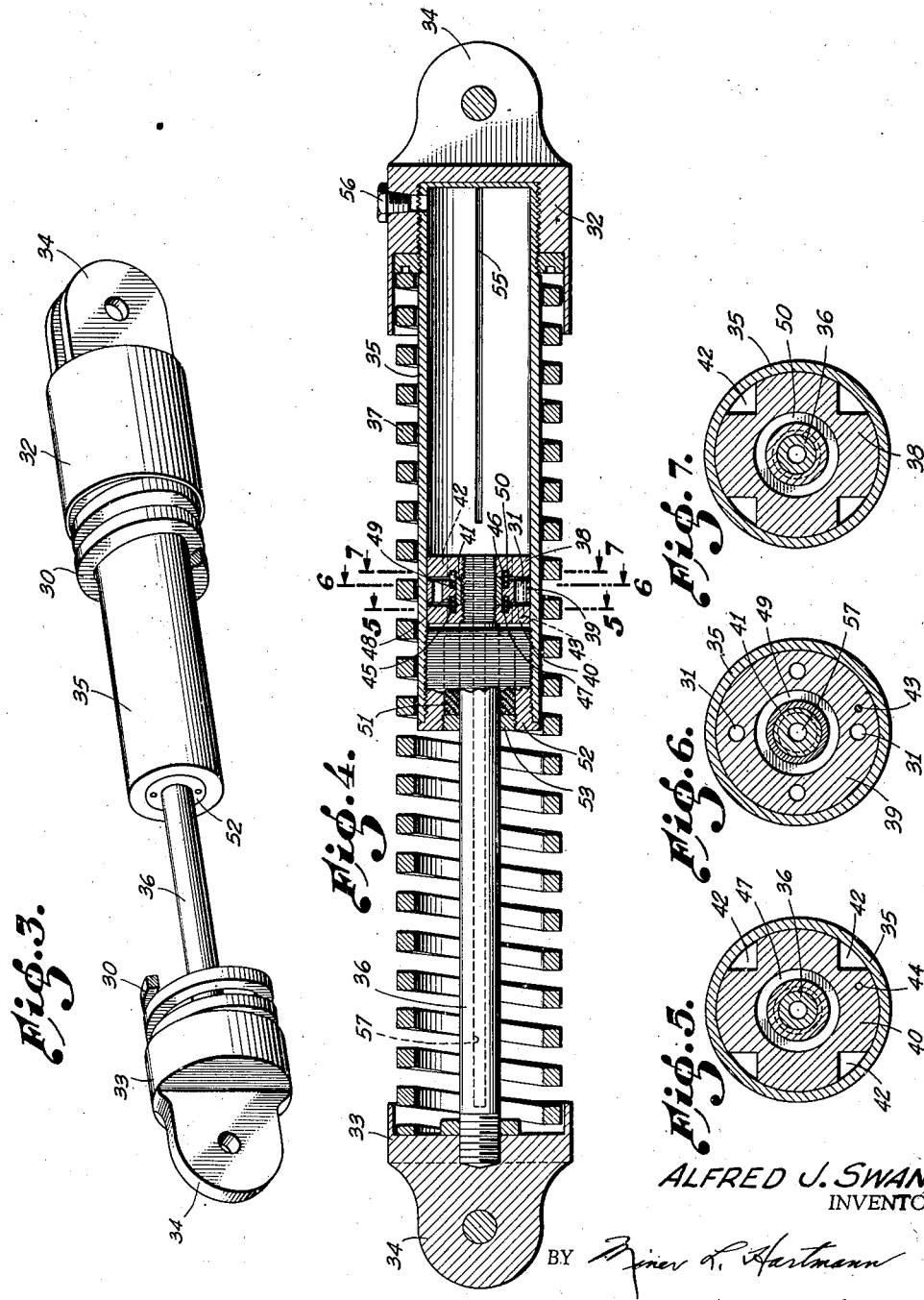

Patented Oct. 2, 1945

2,385,891

UNITED STATES PATENT OFFICE 2,385,891

HYDRAULIC CONTROL

Alfred J. Swanson, Los Angeles, Calif.

Application October 4, 1940, Serial No. 359,665

1 Claim. (Cl. 267—1)

This invention relates to a hydraulic checking device and in particular to a control for preventing the oscillatory turning or shimmy of a swivel mounted wheel such as the tail wheel of an airplane.

In airplane construction it is usual practice to provide a tail wheel in which the wheel mounting has a swivel connection with the plane. While it is customary to provide a structure which will permit the wheel and its mounting to be rotated through the entire 360° around a substantially vertical axis this is not always necessary because the tail wheel mounting is seldom required to make a complete revolution even during manipulation of the plane on the ground. However, it is important that the tail wheel, when the plane is off the ground or is about to take off, should be oriented in the proper position corresponding to the forward movement of the plane, and this may be accomplished by pivoted levers attached to the swivel shaft which are constantly under spring stress to hold the shaft in the desired forward position. Provision is sometimes made to lock the mounting in this forward movement position by lever or cable connections operable by the pilot. It has been found that the tail wheel with or without the locking arrangement in the forward position has a marked tendency to oscillate or shimmy when in contact with the ground at the high speeds involved in taking off and landing, and this shimmy action disastrously affects the control of the airplane. By my invention, any sudden turning of the mounting or shimmy is instantly blocked and the oscillatory action entirely eliminated.

One object of this invention is to provide a hydraulic checking device by which sudden movements of relatively moveable parts may be immediately checked. Another object is to provide a hydraulic device to prevent sudden rectilinear or rotary motion in either direction. Another object is to provide a control device by which moveable parts held under stress may be prevented from shimmying. Another object is to provide a device to prevent the shimmy of a swivel mounted wheel of an airplane. Still another object is to provide a non-oscillatory orienting mechanism for a swivel mounted airplane wheel or the like. These and other objects are accomplished by my invention as will be apparent from the more detailed description below reference being made to accompanying drawings in which;

Figure 3 is a perspective view of my hydraulic spring control device.

Figure 4 is a longitudinal sectional view partly in elevation of my hydraulic checking mechanism.

Figure 5 is a cross sectional view of the hydraulic cylinder taken on the line 5—5 of Figure 4.

Figure 6 is a cross sectional view of the hydraulic cylinder taken on the line 6—6 of Figure 4.

Figure 7 is a cross sectional view of the hydraulic cylinder taken on the line 7—7 of Figure 4.

Figure 1:
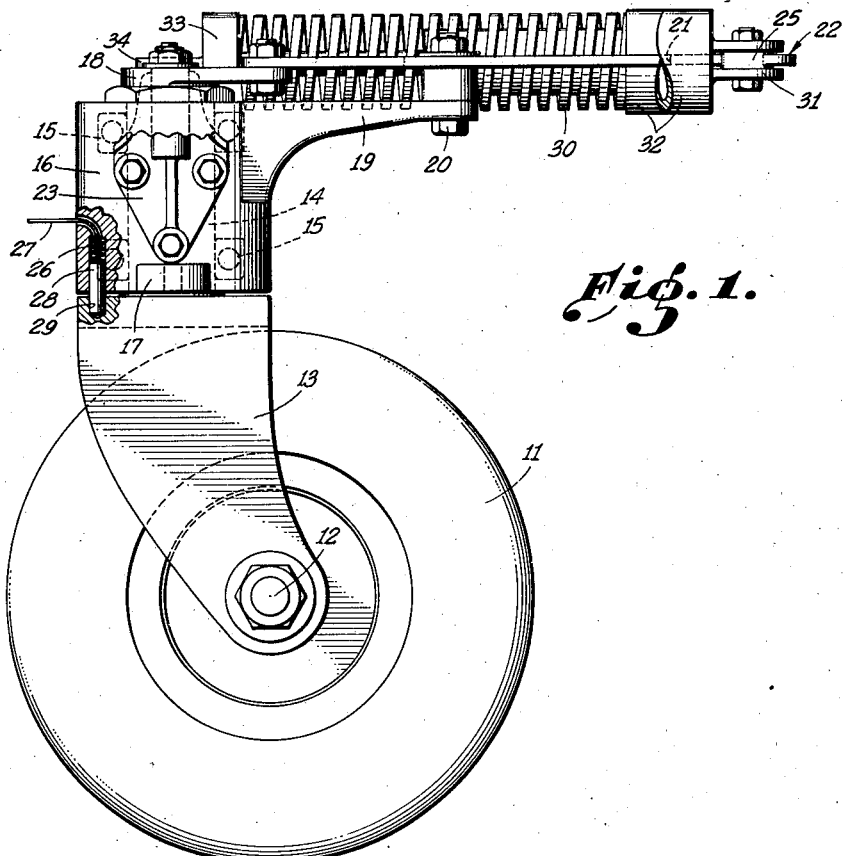
Figure 1 shows in elevation a self-aligning airplane tail wheel assembly.
Figure 2:
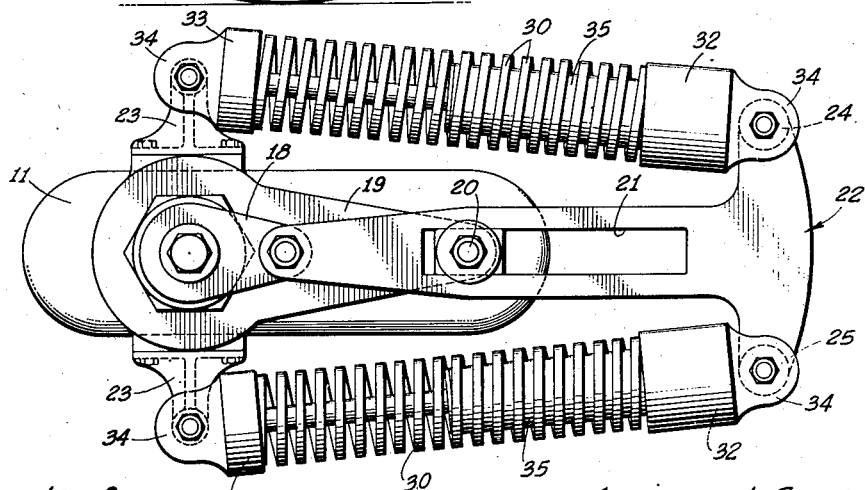
Figure 2 is a plan view of the same.

Referring to the drawings a swivel tail wheel assembly is shown in Figures 1 and 2 in which a traction wheel 11 is mounted for rotation on a spindle 12 which is held in a forked frame 13 terminating in a vertical swivel shaft 14 adapted for rotation in bearings 15, mounted in a supporting member 16 which is provided with attaching means 17 for holding the tail wheel assembly to the retraction gear or to the body of the plane. At the end of the shaft 14 is provided a crank 18 which is adapted to turn with the wheel mounting through 360°. Extending rearwardly from the supporting means 16 is a bracket 19 having a pivot 20 which engages a slot 21 in the stem of a T-shaped lever arm 22, the end of which is pivotally attached to the crank 18. The supporting means 16 is also provided with cross brackets 23 extending substantially at right angles to bracket 19. Attached to each arm 24 and 25 of the T member 22, and to one of the cross brackets 23 is a hydraulically controlled compressed coiled spring. The action of the compression springs 30 is to cause the wheel mounting, when it is not being forcibly turned on the swivel shaft, to return to the position for forward plane movement. When the wheel mounting is turned, the revolving crank 18 draws the T-shaped member 22 forward in the slot 21 and at the same time it turns on the pivot pin 20. The springs 30 on either side are compressed, the maximum compression being when the turn is 180°. This turning may be either clock-wise or counter-clock-wise, but in any case when the turning force is released the springs realign the wheel mounting in the forward direction.

A locking device for the swivel shaft in the forward position is sometimes provided, this being operated either manually or by remote control means by the pilot. A locking pin 26 in the support means 16 is normally pressed downward into the recess 29 in the thrust-bearing shoulder of the swivel frame 13 by a coil spring 26. When it is desired to lock the swivel mounting at the position for forward movement of the airplane, the cable 27 is released, or when it is desired to permit movement in the swivel mounting the pin is held up by the cable.

In the landing and taking off of a plane, while the tail wheel is in traction, irregularities in the ground surface as well as lateral thrusts due to stresses on the plane structure cause the wheel to deviate from the straight line motion, and there is a marked tendency for the tail wheel to shimmy, which sets up a dangerous vibration and sometimes a rocking of the whole airplane. In order to avoid this shimmy action in my invention each spring is equipped with a hydraulic control device fastened by the ends of the arms of the T-shaped member and the cross brackets of the supporting means, that is paralleling the direction of expansion and contraction of the coiled compression springs fastened between these points.

The hydraulically controlled spring unit shown in detail in Figures 3 to 7 consists of end caps 32 and 33 each being provided with attachment means 34 for pivotal fastening to the arms 24 and 25 of the T-shaped member 22 and the corresponding brackets 23 of the supporting means. A cylinder 35 has a closed end within the cap 32, while at the opposite end of the device the piston rod 36 is threadedly attached inside the cap 33. The compressed spring 37 is seated in each cap, at one end around the cylinder 35 and inside the enlarged skirt of the end cap 32; and at the other end inside a skirt in the end cap 33, surrounding the piston rod 36. Inside the cylinder 35 attached to the piston rod 36, is a piston head consisting of three members, 38, 39, and 40, two of which, 38 and 40, are fixedly threaded to the piston rod end, while the third member 39, disposed between the other two, is free to slide on a collar 41 threaded on the piston rod and holding the two members 38 and 40 apart for a distance a little greater than the thickness of the sliding member 39. The fixed piston members 38 and 40 are provided with openings 42 and the sliding member is also provided with openings 31 through it from one face to the other, the latter openings being out of register with the openings 42 of the fixed members. The sliding member 39 is prevented from rotation on the piston rod by the pin 43 in the sliding member 39 coacting with a hole 44 in member 40. Opposed coil springs 45 and 46 are provided in countersunk grooves 48 and 49 in both sides of the sliding member 39, and in grooves 47 and 50 respectively in the fixed members 38 and 40, these springs exerting substantially equal expanding force so that the sliding member 39 is normally disposed intermediate the fixed members 38 and 40. These springs 45 exert very little pressure, so that the sliding member is easily moved against either fixed member depending upon the direction of movement of the piston.

Suitable pressure packing 51 is provided around the piston rod 36 where it enters the cylinder 35, in the packing box provided in the threaded end plug 52, a threaded pressure plug 53 being adapted for tightening the packing around the rod.

A by-pass groove 55 is provided in the cylinder side wall near the closed end so that the piston may move freely in that part of the cylinder. Since the shimmy in the tail wheel occurs only when substantially straight line movement of the plane occurs, the checking action is not desired except at the position of the piston corresponding to its straight ahead location and a small distance to either side of this center position corresponding to the maximum angle of turning of the swivel shaft in a shimmying movement.

A plug 56 for filling the cylinder with liquid is provided near the closed end. In order to compensate, at least in part, for the volume of liquid equal to the variable portion of the piston rod inside the cylinder in different positions, a hole 57 in this rod is provided. The hydraulic unit is preferably positioned in use so that the closed end of the cylinder is more elevated than the other end, so that any air or gas within the cylinder will collect in the upper part where it will not interfere with the desired checking action.

The advantages of my invention will be apparent to those skilled in this art. The avoidance of vibration or shimmying in airplane tail wheels is a most important requirement for safe landing and taking off. My hydraulic control is simple in action, reliable, and free from construction complexities and maintenance expense.

While I have shown and described specific forms of my invention, I do not wish to be restricted to the embodiments shown, but limit my invention only in so far as required by the prior art and the spirit of the appended claim.

I claim:

A spring unit comprising: a coil spring; a piston rod, piston and liquid containing cylinder assembly; and means for holding said coil spring in compression between the outer end of said piston rod and the cylinder; the piston of said assembly having two fixed apertured members and one movable apertured member disposed therebetween, said movable member being adapted upon sudden movement to make contact with the juxtaposed face of one of said fixed members to cut off flow of liquid therethrough the apertures in the sliding piston member being in staggered relation to the apertures in both fixed members, and spring members adapted to normally maintain said movable member out of contact with said fixed members.

ALFRED J. SWANSON.